(12) United States Patent
Seres, Jr. et al.

(10) Patent No.: US 6,174,158 B1
(45) Date of Patent: *Jan. 16, 2001

(54) INJECTION MOLDING SHUT-OFF BUSHING WITH SEPARATE MATERIAL FLOW PATH

(75) Inventors: Eric J. Seres, Jr., W. Bloomfield; David Reitan; Scott R. Greb, both of Clinton Township, all of MI (US)

(73) Assignee: Incoe Corporation, Troy, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 09/175,629

(22) Filed: Oct. 20, 1998

Related U.S. Application Data

(63) Continuation of application No. 08/974,638, filed on Nov. 19, 1997, now Pat. No. 5,895,669
(60) Provisional application No. 60/049,531, filed on Jun. 13, 1997.

(51) Int. Cl.[7] .................................................... B29C 45/20
(52) U.S. Cl. .................... 425/549; 264/328.15; 425/562; 425/564
(58) Field of Search .................................... 425/549, 562, 425/564; 264/328.15

(56) References Cited

U.S. PATENT DOCUMENTS

| | | |
|---|---|---|
| 3,010,155 | 11/1961 | Gilmore . |
| 4,095,931 | 6/1978 | Reitan . |
| 4,161,386 | 7/1979 | Osuna-Diaz . |
| 4,266,723 | 5/1981 | Osuna-Diaz . |
| 4,273,525 | 6/1981 | Reitan . |
| 4,279,582 | 7/1981 | Osuna-Diaz . |
| 4,412,807 | 11/1983 | York . |
| 4,712,995 | 12/1987 | Basnett . |
| 4,810,184 | 3/1989 | Gellert . |
| 4,925,384 | 5/1990 | Manner . |
| 5,513,976 | 5/1996 | McGrevy . |
| 5,895,669 | * 4/1999 | Seres, Jr. et al. ........... 425/549 |

* cited by examiner

*Primary Examiner*—Tim Heitbrink

(57) ABSTRACT

A mold bushing for injecting plastic material into a mold cavity. The bushing member has a one-piece body member with a central passageway for a shut-off gate pin member and a separate and distinct passageway for the molten plastic material. A tip member is positioned on the end of the body member and has a material discharge chamber. A gate or orifice opened and closed by the pin member is positioned either in the tip member or the mold. A wear bushing member is positioned in the discharge chamber or the end of the body member and acts to support the end of the pin member and prevent the flow of plastic material into the central passageway. The body member is heated by an annular cast heater member or the like. The wear bushing member can be indexed for proper positioning relative to the body member and the plastic flow passageway. The wear bushing member preferably has a body portion which partially fills the discharge chamber in the tip member. In an alternate embodiment, the body member has an extension which partially fills the discharge chamber and the wear bushing is a cylindrical member positioned at the discharge end of the central passageway.

15 Claims, 2 Drawing Sheets

INJECTION MOLDING SHUT-OFF BUSHING WITH SEPARATE MATERIAL FLOW PATH

CROSS-REFERENCE TO RELATED APPLICATION

This is a continuation of copending application(s) Ser. No. 08/974,638 filed on Nov. 19, 1997 now U.S. Pat. No. 5,895,669 and claims the benefit from prior filed co-pending provisional application Ser. No. 60/049,531, filed Jun. 13, 1997.

TECHNICAL FIELD

This invention relates to bushings for injection molding systems wherein the bushings have a controllable gate or orifice.

BACKGROUND OF THE INVENTION

Injection molding bushings are utilized to transfer molten plastic material from an injection molding machine into the cavity of a mold. The bushings are positioned in molds attached to platens of the injection molding machine and are adapted to transfer the molten plastic material from the nozzle of the injection molding machine barrel to the mold cavities.

The mold bushings, often called "sprue bushings," can be unheated or heated. Unheated bushings leave an elongated sprue on the molded part which normally has to be trimmed or cut off. Heated bushings, which leave little if any sprue on the part, can be centrally heated or externally heated and can also have pins or other shut-off mechanisms for opening and closing the gate or orifice as required.

Internally heated mold bushings can have a heated torpedo-like member positioned in the flow stream. Bushings of this type are shown, for example, in U.S. Pat. Nos. 3,010,155 and 4,161,386. Mold bushings which are heated externally can have annular heating elements positioned around a central flow passageway. These are shown, for example, in U.S. Pat. Nos. 4,273,525 and 4,266,723. The heating elements can be coil heaters, cast heaters, or conventional band-type heaters, all of which maintain the plastic material in the bushing in a molten condition.

Many of the mold bushings have gates or orifices which are controlled by a pin-type mechanism or the like to open and close the orifice in accordance with the desired process for filling the mold. The pin members are typically controlled by a motorized or automatic mechanism of some type, such as shown in U.S. Pat. Nos. 4,095,931 or 4,279,582.

In known valve gate-type bushings, all or a substantial portion of the pin member is contained within the molten plastic flow. The pin member partially divides the mass of plastic material in the bushing which often causes undesirable features in the molded parts, such as blemishes and weld lines. With some materials, the pin member prevents satisfactory intermixing of the material. Also, the pin member can result in the formation of shear planes in the molten material which can cause unsightly blemishes or lines in the fin al part, and may cause areas of weakness in the final part.

Some bushing s which have partially solved these problems are shown, for example, in U.S. Pat. No. 4,925,384 to Manner, and U.S. Pat. No. 4,412,807 to York. However, the '384 patent does not adequately separate the material from the moving pin member thus creating unsightly or unwanted defects in the final part. Also, the '807 patent contains several additional machined components creating a more costly and complex device.

SUMMARY OF THE INVENTION

It is an object of the present invention to provide an injection molding bushing which is an improvement over known bushings. It is another object of the present invention to provide an improved bushing member which is easier and less costly to manufacture.

It is a further object of the present invention to provide a mold bushing which completely separates the shut-off pin from the material flow in the bushing. It is a still further object of the present invention to provide an improved mold bushing which does not contain any components or structure which separate the flow of material therein and thus which creates a final product which is more acceptable, both in aesthetics and strength.

These and other objects and purposes of the present invention will become apparent from the following description of the invention, when viewed in accordance with the attached drawings and appended claims.

In general, the present invention provides a mold bushing with an integral one-piece body member having an external heating member and separate passageways for the material flow and for the shut-off pin. The mold bushing body member is preferably externally heated around its periphery by a cast heating member, although other conventional types of heating members can also be utilized. The body member preferably has a separate tip or end member in which the orifice (or gate) is situated. The tip member also has a central discharge chamber. The pin member is centrally positioned in the body member and is adapted to mate with and open/close the gate or orifice. The flow passageway is substantially parallel to the passageway in which the gate pin is positioned and operates to receive and transfer the molten plastic material from an injection molding machine and/or manifold into a mold cavity.

A separate wear bushing member, preferably is provided and positioned adjacent the body member in the discharge chamber. The wear bushing member has an indexing member and fills a substantial portion of the discharge chamber in the tip assembly. This keeps the plastic material from degrading prior to being injected into the mold cavity.

In an alternate embodiment, the body member is extended into the discharge chamber and a separate cylindrical wear bushing is provided in the end of the body member in order to support the end of the gate pin. In another embodiment of the invention, the gate or orifice is provided in the mold die creating a "topless" -type of mold bushing arrangement.

These and other features, benefits and advantages of the present invention will become apparent from a review of the following description of the invention, when viewed in accordance with the attached drawings and appended claims.

BEST MODE OF THE INVENTION

Figure 1:
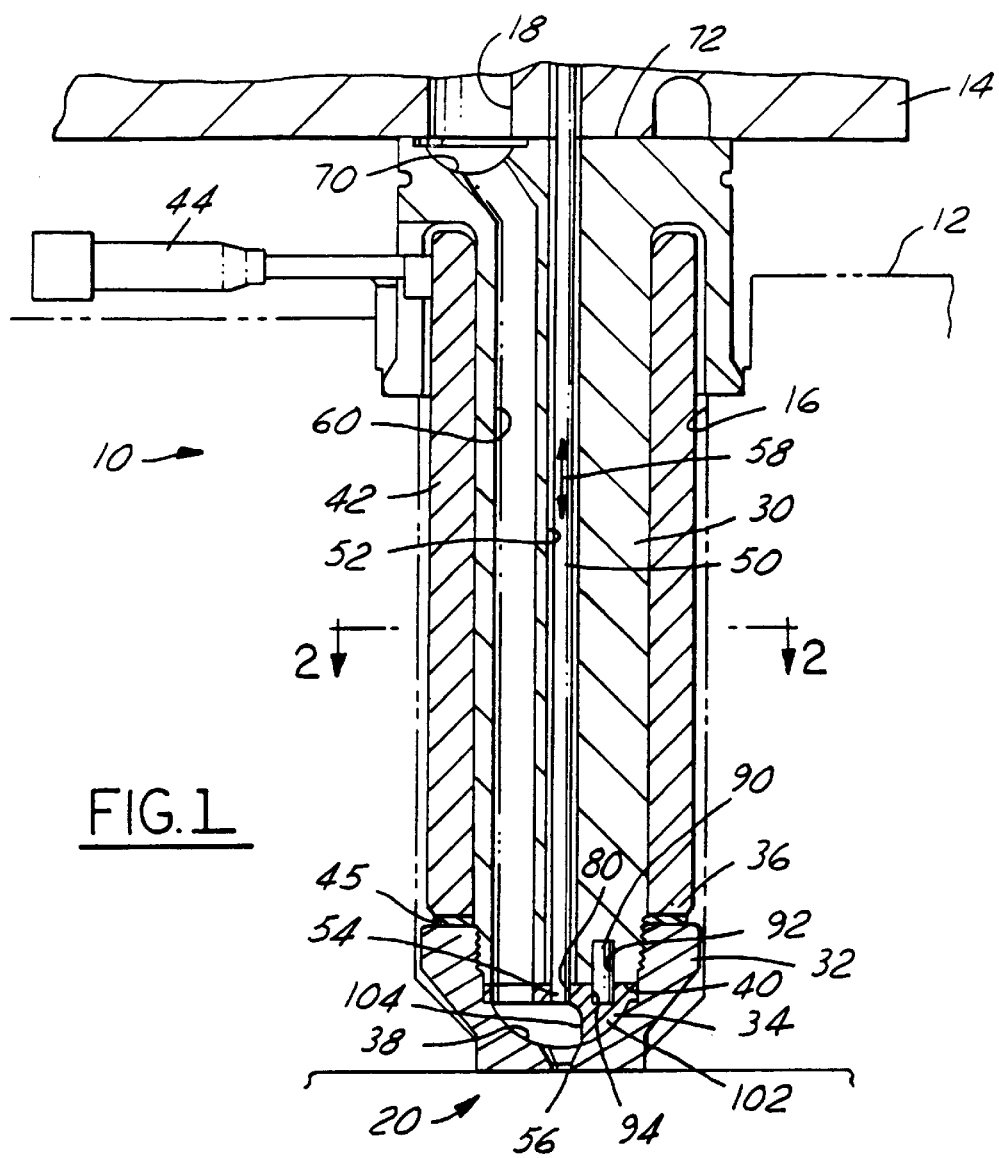
FIG. 1 is a cross-sectional view of the inventive mold bushing.

The inventive injection molding bushing member is utilized in injection molding processes in which an injection molding machine with one or more movable platens is utilized to open and close various mold dies and inject molten plastic material into a mold cavity to form an injection molded part. In this regard, the present invention can be utilized with any known or conventional injection molding machine, injection molding nozzle, molding dies, and injection molding systems. As a result, these features are not shown in the drawings nor are they part of the present invention.

The bushing member 10 is preferably positioned in one-half of a mold 12 and positioned in communication either directly with an injection molding machine nozzle, or with a manifold member 14 of any conventional type. Where a manifold 14 is utilized, it is typically secured directly to the mold die 12 thereby securely fastening together the mold, manifold and bushing member.

The mold bushing member 10 is positioned in a cavity 16 in the mold die 12 and is utilized to transfer molten plastic member from conduit 18 in the manifold through the mold die 12 into a mold cavity 20. The mold cavity 20 is provided in the shape of the final part to be molded.

The bushing member 10 includes an elongated central body member 30, a tip member 32 and a wear bushing member 34. The tip member 32 is preferably threadedly attached to the body member 30 by mating thread members 36. The wear bushing member 34 is positioned in discharge chamber 38 in the tip member 34 which is provided immediately below the lower surface 40 of the body member 30.

The body member 30 is heated throughout its length by a heating element or member 42. The heater 42 can be of any conventional type and is heated electrically through conduit 44. Preferably, a cast heater is utilized, although other types of heating members can be utilized, such as coil heaters and band-type heaters. An insulating washer 45 is positioned between the tip member 32 and the heating member 42.

Shut-off pin member 50 is positioned in passageway or bore 52 which is centrally positioned in the body member 30. The pin member 50 has an end 54 which is adapted to mate with gate or orifice 56 in the tip member 32. Pin member 50 is controlled by an automatic or motorized mechanism of conventional type (not shown) and is adapted to move or reciprocate longitudinally in the direction of arrows 58. In this regard, when the pin member 50 is in the position shown in 51, the end 54 is positioned out of the flow of plastic material and allows plastic material to flow directly into the mold cavity 20. When it is desired to stop or shut-off the flow of plastic material into the mold cavity, the pin member 50 is moved longitudinally by the mechanized or motor mechanism in order to position the end 54 in the gate or orifice 56.

A second channel or conduit 60 is also provided in the body member 30. Conduit 60 transfers the molten plastic material from the injection molding machine and/or manifold 14 into and through the bushing member 10. Conduit or passageway 60 is preferably substantially parallel to bore or passageway 52 in which the movable pin member is positioned, although this is not mandatory. The angularity and position of conduit 60 is provided based on practical considerations, such as ease and cost of manufacture and assembly.

The heater member 42 keeps the plastic material positioned in the conduit 60 in a molten condition. In this regard, the temperature of the heater member 42 is controlled by a conventional temperature controller (not shown) which maintains the temperature of the body member 30 and thus plastic material within the proper temperature range specified for the particular plastic material utilized in the molding process.

An inlet 70 is provided at the upper end 72 of the body member 30 in order to assist in transferring the plastic material from the manifold or nozzle into the conduit or passageway 60. The inlet 70 can be of any conventional type and depends on whether the bushing member is attached to a manifold member or directly to the nozzle of an injection molding machine. Inlets of this type are conventionally known in the injection molding industry.

The wear bushing member 34 is made of a strong durable material, such as hardened steel, a ceramic, a plastic composite, or the like, and provides adequate strength and stability for the end 54 of the pin member 50. In this regard, wear bushing member 34 has an opening 80 in the center thereof which very closely fits the outer diameter of the pin member 50. In this regard, the differences in diameter between the opening 80 and the pin member 50 should be relatively small such that molten plastic material cannot be forced into the chamber 52. Preferably, this difference is on the order of 0.0001 and 0.0010 inches.

The wear bushing member 34 also contains a second opening 82 which forms an extension of the conduit or passageway 60 for passage of the molten plastic material from the body member 30 into the chamber 38.

In order to assure that opening 82 is precisely aligned with passageway 60, an indexing pin 90 is positioned in opening 92 in the body member 30 and aligned opening 94 in the wear bushing member 34. In this regard, although the use of pin 90 is shown as the indexing member, it is understood that any conventional or equivalent type of indexing means or members could be utilized.

As shown in the drawings, the wear bushing member 34 has a first cylindrical disk type body member 100 and a protruding or extending enlarged second body member 102. The body member 102 partially fills the chamber 38 and makes it smaller in volume. The body member 102 also has a face or surface member 104 which is used to help deflect and direct the flow of plastic material from passageway 60 through the gate or orifice 56 and into the mold cavity. The reduction in size of the discharge chamber 38 that is keeping the chamber volume to a minimum size or capacity assists in preventing the plastic material from residing in the discharge chamber too long and thus degrading during the molding process.

Figure 2:
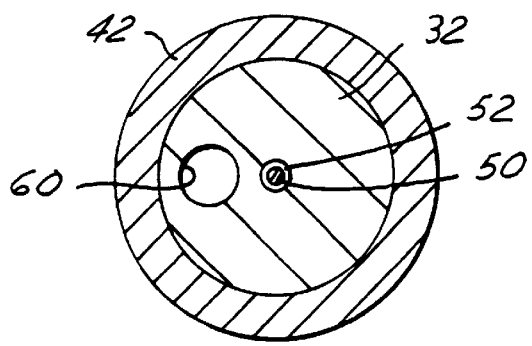
FIG. 2 is a cross-sectional view taken along lines 2—2 of FIG. 1 and in the direction of the arrows.
Figure 3:
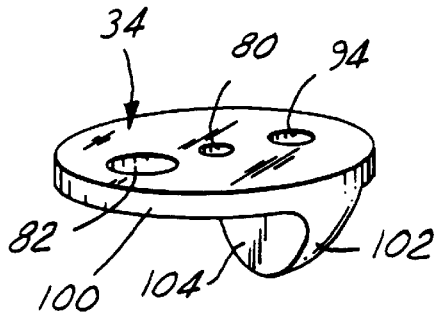
FIG. 3 is a perspective view of the preferred wear bushing member utilized with the present invention.
Figure 4:
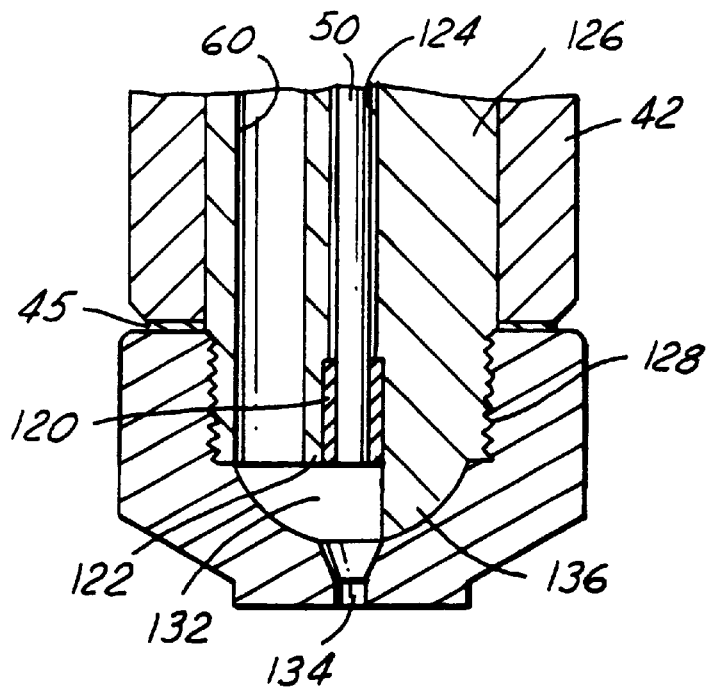
FIG. 4 illustrates an alternative embodiment of the invention.
Figure 5:
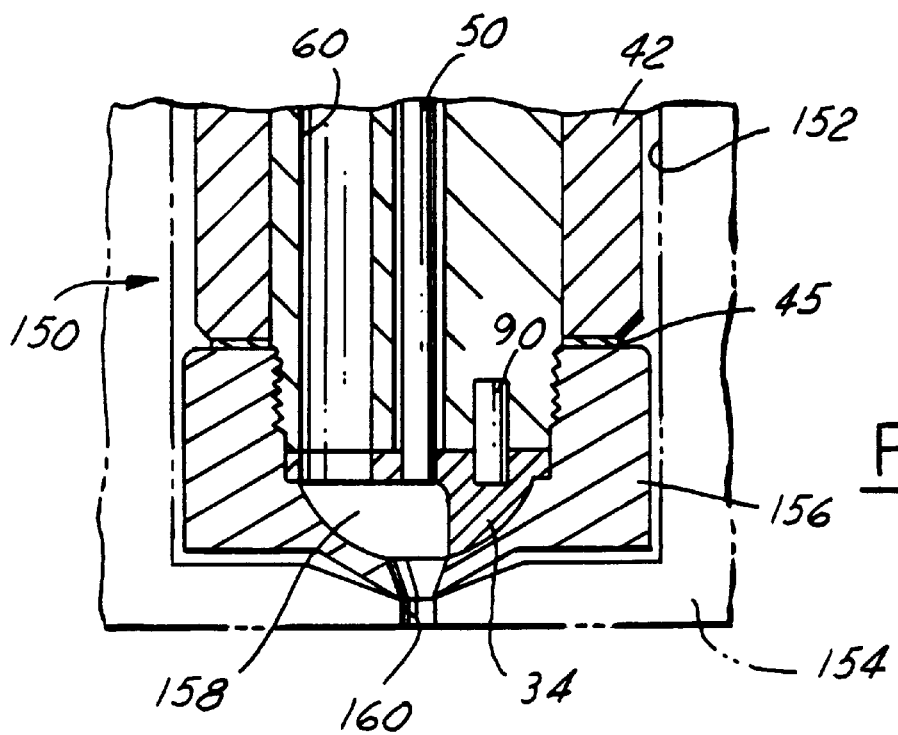
FIG. 5 illustrates still another alternate embodiment of the invention.

Other embodiments of the invention are shown in FIGS. 4 and 5. In FIG. 4, the wear bushing 120 is a cylindrical member positioned in the lower or discharge end 122 of the central passageway 124 in the body member 126. The tip member 128 is threadedly secured on the lower end of the body member by thread means 130 and has a discharge chamber 132 and a gate or orifice 134. An extension 136 of the lower end of the body member 126 extends into and partially fills the discharge chamber 132 reducing its volume. (Where parts or features in FIGS. 4 and 5 are substantially the same as those mentioned above with respect to FIGS. 1–3, they are marked or indicated by the same reference numbers).

A "topless" bushing version of the present invention is shown in FIG. 5. In this embodiment, the bushing 150 is positioned in a recess 152 in a mold die member 154. A tip member 156 is secured or fastened on the lower end of the one-piece body member and a wear bushing member 34 is positioned in the discharge chamber 158 in the tip member. As opposed to the embodiments described above, the gate or orifice 160 is contained in the mold die member 154 rather than the tip member. This embodiment produces a smaller ring outline or "footprint" on the finished molded part.

While the best modes for carrying out the invention have been described in detail, those familiar with the art to which this invention relates will recognize various alternative designs and embodiments for practicing the invention as defined by the following claims.

What is claimed is:

1. An injection mold bushing comprising:

a one-piece elongated body member having a longitudinal axis;

said body member having two ends and a first elongated passageway substantially centrally located in said body member and substantially parallel to said longitudinal axis;

said body member having a second longitudinal passageway substantially parallel to said longitudinal axis;

an inlet on a first end of said body member for introducing molten plastic material into said second elongated passageway;

a tip member positioned on a second end of said body member, said tip member having an orifice therein for passage of molten plastic material therethrough, and having a discharge chamber therein; and a wear bushing member positioned in said chamber and at said second end of said body member, said wear bushing member having a first opening therein in alignment with said first elongated passageway.

2. The injection mold bushing of claim 1 wherein said wear bushing member has a second opening therein in alignment with said second elongated passageway in order to transfer plastic material from said second elongated passageway into said discharge chamber.

3. The injection mold bushing of claim 2 further comprising an indexing member for accurately positioning said wear bushing member relative to said body member such that said second opening is in alignment with said second elongated passageway.

4. The injection mold bushing of claim 3 wherein said indexing member comprises a pin member.

5. The injection mold bushing of claim 4 wherein said pin member is positioned partially in said body member and partially in said wear bushing member.

6. The injection mold bushing of claim 1 wherein said wear bushing member has a first body portion positioned adjacent said second end of said body member and a second body portion which extends into and partially fills said discharge chamber.

7. The injection mold bushing of claim 6 wherein said second body portion has a surface member thereon which directs plastic material into said orifice.

8. The injection mold bushing of claim 1 wherein said tip member is threadedly attached to said body member.

9. The injection mold bushing of claim 1 further comprising heating means on said body member for heating said second elongated passageway to keep plastic material therein in a molten condition.

10. The injection mold bushing of claim 9 wherein said heating means comprises a cast heating member.

11. The injection mold bushing of claim 1 further comprising a pin member positioned in said first elongated passageway.

12. An injection molding system for plastic materials comprising a molding machine, a manifold, a mold having a part cavity, a mold bushing positioned in said mold, a shut-off pin member and a mechanism for operating said pin member to regulate the flow of plastic material through said mold bushing and into said part cavity, said improvement comprising:

said mold bushing having a one-piece body member with a first passageway for said pin member and a separate second passageway for flow of plastic material therethrough;

said mold bushing also having a tip member attached therein, said tip member having a discharge chamber therein; and a wear bushing member having a first body portion and a second body portion, at least said second body portion being positioned in said discharge chamber.

13. The injection molding system of claim 12 wherein said wear bushing member comprises a cylindrical member positioned in the end of said first passageway in said body member.

14. The injection molding system of claim 12 wherein said tip member includes a gate.

15. The injection molding system of claim 12 wherein said mold includes a gate.

* * * * *